United States Patent
Lau et al.

(10) Patent No.: US 8,984,067 B2
(45) Date of Patent: Mar. 17, 2015

(54) SESSION INITIATION PROTOCOL (SIP) SIGNALING TO KEEP A VOICE OVER INTERNET PROTOCOL (VOIP) SESSION ACTIVE DURING A CALL HOLD

(75) Inventors: Priscilla Lau, Fremont, CA (US); Loc Ba Vo, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 991 days.

(21) Appl. No.: 12/581,322

(22) Filed: Oct. 19, 2009

(65) Prior Publication Data

US 2011/0093542 A1   Apr. 21, 2011

(51) Int. Cl.
  *G06F 15/173* (2006.01)
  *H04L 29/06* (2006.01)

(52) U.S. Cl.
  CPC .................................. *H04L 65/1083* (2013.01)
  USPC ........................................................ 709/206

(58) Field of Classification Search
  USPC .......... 709/205–207; 370/260–265, 241–248, 370/331–358
  See application file for complete search history.

(56) References Cited

U.S. PATENT DOCUMENTS

| | | | |
|---|---|---|---|
| 2004/0229596 A1* | 11/2004 | Stura et al. | 455/406 |
| 2005/0213518 A1* | 9/2005 | Ahya et al. | 370/276 |
| 2006/0210037 A1* | 9/2006 | Olafsson et al. | 379/93.34 |
| 2008/0239997 A1* | 10/2008 | Walker et al. | 370/261 |
| 2009/0135769 A1* | 5/2009 | Sambhwani et al. | 370/329 |
| 2010/0124211 A1* | 5/2010 | Payyappilly et al. | 370/338 |

OTHER PUBLICATIONS

Holms, "Session Control in SIP-Based Media Services", WIPO Publication, Sep. 28, 2008 WO 2008/113417, PCT/EP2007/052682, All pages.*
"Call hold supplementary service for H.323". Telecommunication Standardization Sector of ITU. May 1999.*
J. Rosenberg et al., "SIP: Session Initiation Protocol," Network Working Group, Request for Comments: 3261, Jun. 2002, 252 pages.
M. Handley et al., "SDP: Session Description Protocol," Network Working Group, Request for Comments: 4566, Jul. 2006, 46 pages.

* cited by examiner

*Primary Examiner* — Scott B Christensen

(57) ABSTRACT

A device monitors a session description protocol (SDP) parameter associated with a voice over Internet protocol (VoIP) call provided via a network and a user equipment, and determines, based on the SDP parameter, whether the VoIP call changed from an active state to a hold state or from a hold state to an active state. The device also sends, after the VoIP call is determined to change from an active state to a hold state, a session initiation protocol (SIP) keep alive message to the user equipment to prevent the user equipment from entering a dormant state and to prevent a radio link connection between the user equipment and the network from being released.

22 Claims, 9 Drawing Sheets

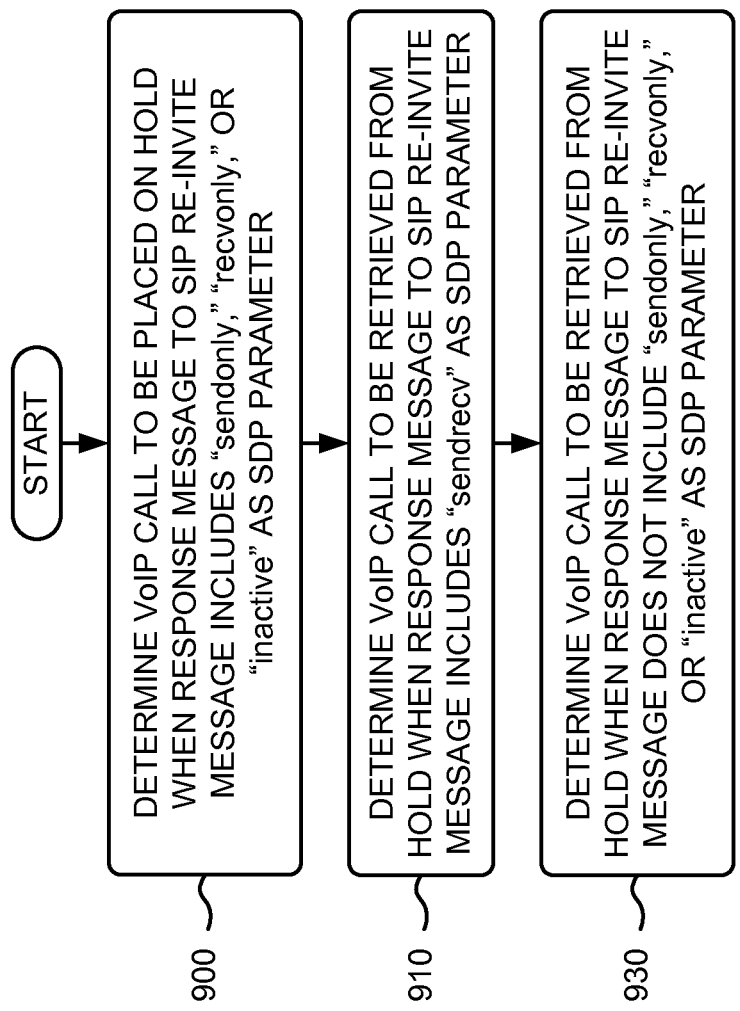

SESSION INITIATION PROTOCOL (SIP) SIGNALING TO KEEP A VOICE OVER INTERNET PROTOCOL (VOIP) SESSION ACTIVE DURING A CALL HOLD

BACKGROUND

A radio network controller (RNC) (or an evolved RNC (eRNC)) in a wireless network usually maintains an inactivity timer (or time limit) for each active wireless user equipment (UE) (e.g., mobile communication devices, cell phones, mobile terminals, mobile handsets, personal digital assistants (PDAs), etc.). When the RNC does not detect activity from a UE for the duration of the inactivity timer, the RNC changes the UE's status from active to dormant and releases bearer resources (e.g., wireless network resources) for a real-time transport protocol (RTP) packet flow assigned to the UE. When a voice over Internet protocol (VoIP) call (e.g., associated with the UE) is put on hold, no RTP packets are transmitted between the RNC and the UE until the VoIP call is retrieved from hold. If the VoIP call is placed on hold for a duration of time that is longer than the inactivity timer, the RNC will change the UE's status from active to dormant and will release bearer resources (e.g., a radio link between the RNC and the UE) associated with the VoIP call when the inactivity timer expires.

When the VoIP call is retrieved from hold, it takes time for the UE to change its status from dormant to active and for the bearer resources to be set up again between the UE and the RNC. Because of this time delay, voice clipping (e.g., when portions of a voice call, such as words, drop off so that they cannot be heard) will occur at the UE and cause an unacceptable experience for a user of the UE when the VoIP call is retrieved from hold. If the VoIP call is set up with a quality of service (QoS) that requires a media path to be available for the VoIP call, the VoIP call may be released unintentionally by the UE when the RNC releases the media path between the UE and the RNC, after expiration of the inactivity timer.

BRIEF DESCRIPTION OF THE DRAWINGS

FIGS. 7-9 illustrate flow charts of an exemplary process for using session initiation protocol (SIP) signaling to keep a VoIP session active during a call hold according to implementation described herein.

DETAILED DESCRIPTION OF PREFERRED EMBODIMENTS

Figure 1:
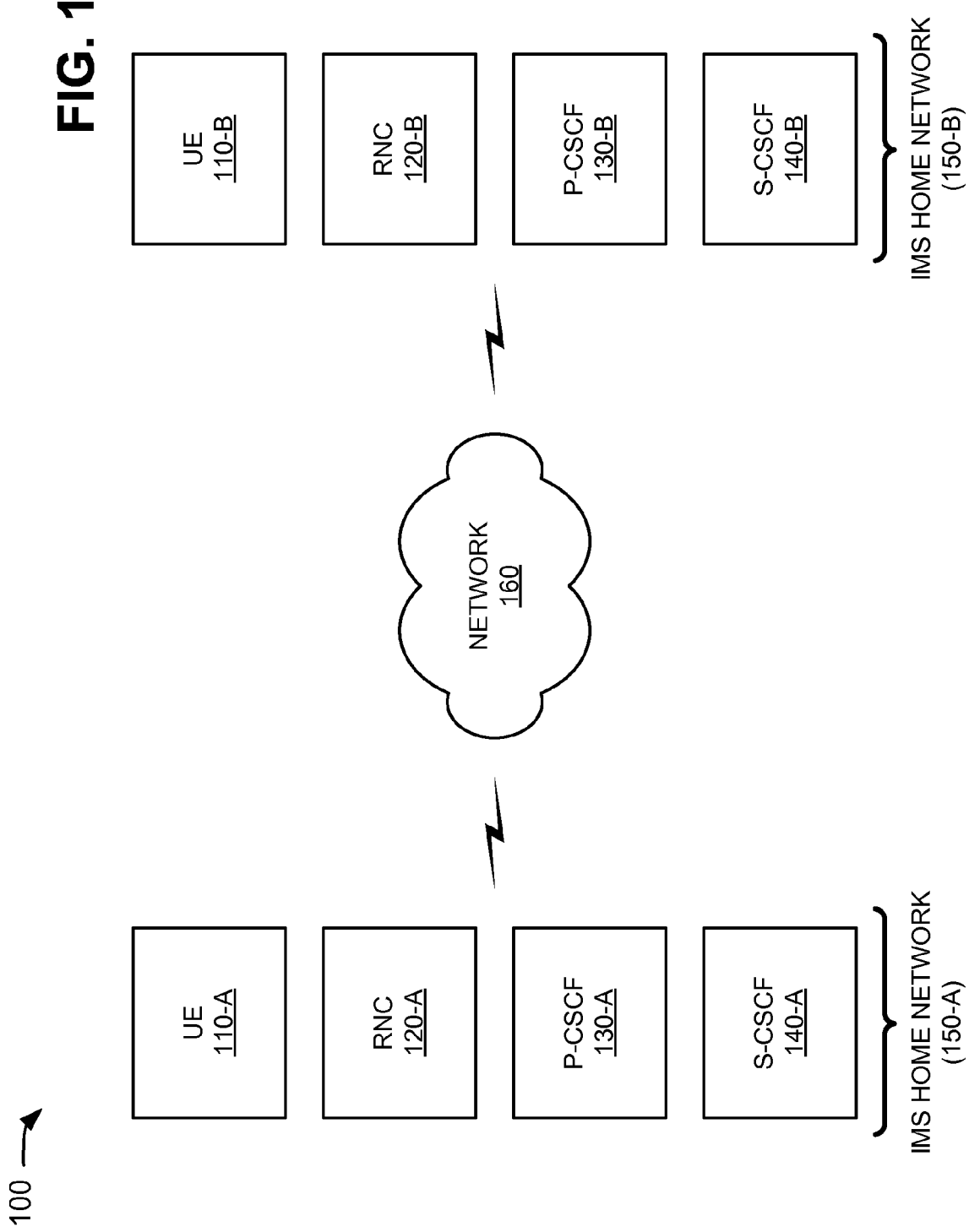
FIG. 1 depicts a diagram of an exemplary network in which systems and/or methods described herein may be implemented.

The following detailed description refers to the accompanying drawings. The same reference numbers in different drawings may identify the same or similar elements. Also, the following detailed description does not limit the invention.

An active call (e.g., between two UEs) may include a media attribute in a session description protocol (SDP) parameter set to "sendrecv" in order to permit two-way transmission of RTP packets for a voice path when the call is first established. When the call is placed on hold, the media attribute in the SDP parameter may be changed to "sendonly" or "recvonly" and may permit one-way transmission of RTP packets from the UE placing the call on hold to the UE being placed on hold. For a VoIP call set up using SIP, a SIP re-invite message may be used to modify the media attribute in the SDP parameter of the VoIP call. The UE placing the VoIP call on hold may send the SIP re-invite message to the UE being placed on hold, and the media attribute in the SDP parameter may be set to "sendonly." If this change is accepted, the UE being placed on hold may return a SIP "200" OK message as a response to the SIP re-invite message (e.g., with the media attribute in the SDP parameter set to "recvonly").

Implementations described herein may provide systems and/or methods that may use SIP signaling to keep a VoIP session active during a call hold. For example, in one implementation, a SIP proxy server may determine if a VoIP call is being put on hold by monitoring a change of a media attribute in a SDP parameter associated with the VoIP call. When the VoIP call is placed on hold, the SIP proxy server may send a SIP signaling message (e.g., a keep alive message) repeatedly to a UE (e.g., served by the SIP proxy server) in order to prevent a RNC from putting the UE into a dormant state (e.g., due to expiration of the inactivity timer). The SIP proxy server may determine if the VoIP call is being retrieved from hold by monitoring a change of the media attribute in the SDP parameter associated with the VoIP call. When the VoIP call is retrieved from hold, the SIP proxy server may stop sending the keep alive message to the UE.

In one exemplary implementation, a serving call session control function (S-CSCF) server device may monitor a SDP parameter associated with a VoIP call involving a UE, and may determine whether the VoIP call changed from active to hold (e.g., from an active state to a hold state) or from hold to active (e.g., from a hold state to an active state) based on the SDP value. If the SDP parameter changes from active to hold, the S-CSCF server device may provide a keep alive message to the UE (e.g., repeatedly) to prevent the UE from going dormant (e.g., due to expiration of the inactivity timer). If the SDP parameter changes from hold to active, the S-CSCF server device may stop providing the keep alive message to the UE, and the VoIP call may be retrieved from hold.

As used herein, the terms "user" and "caller" are intended to be broadly interpreted to include user equipment (UE) or a user of user equipment.

FIG. 1 is a diagram of an exemplary network 100 in which systems and/or methods described herein may be implemented. As illustrated, network 100 may include user equipment (UE) 110-A and 110-B (referred to collectively as "UEs 110" or singularly as "UE 110"), RNCs 120-A and 120-B (referred to collectively as "RNCs 120" or singularly as "RNC 120"), P-CSCF server devices 130-A and 130-B (referred to collectively as "P-CSCF server devices 130" or singularly as "P-CSCF server device 130"), and S-CSCF server devices 140-A and 140-B (referred to collectively as "S-CSCF server devices 140" or singularly as "S-CSCF server device 140") interconnected by a network 160. UE 110-A, RNC 120-A, P-CSCF server device 130-A, and S-CSCF server device 140-A may form one or more components of an IP multimedia subsystem (IMS) home network 150-A (e.g., for UE 110-A), and UE 110-B, RNC 120-B, P-CSCF server device 130-B, and S-CSCF server device 140-B may form one or more components of an IMS home network 150-B (e.g., for UE 110-B). Components of network 100 may interconnect via wired and/or wireless connections. Two UEs 110, two RNCs 120, two P-CSCF server devices 130, two S-CSCF server devices 140, two IMS home networks 150, and a single network 160 have been illustrated in FIG. 1 for simplicity. In practice, there may be more or fewer UEs 110, RNCs 120, P-CSCF server devices 130, S-CSCF server devices 140, IMS home networks 150, and/or networks 160. Also, in some instances, one or more of the components of network 100 may perform one or more functions described as being performed by another one or more of the components of network 100.

UE 110 may include a landline telephone, a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an exemplary implementation, UE 110 may include a mobile communication device that is capable of supporting a VoIP call with another UE (e.g., via IMS home networks 150-A and 150-B and network 160).

RNC 120 may include one or more devices that may control and manage one or more base stations (not shown), and may perform data processing to manage utilization of radio network services. RNC 120 may transmit/receive voice and data to/from UEs 110, base stations, and/or other RNCs. In one exemplary implementation, RNC 120 may support a VoIP call between UE 110-A and UE 110-B via one or more protocols (e.g., via SIP, SDP, etc.), and may maintain an inactivity timer (e.g., as described above) for each UE 110 associated with RNC 120.

P-CSCF server device 130 may include one or more server devices, or other types of computation or communication devices, that gather, process, search, and/or provide information in a manner described herein. In an exemplary implementation, P-CSCF server device 130 may function as a SIP proxy server for a corresponding UE 110, where SIP signaling traffic to and from the corresponding UE 110 may go through P-CSCF 130 server device. P-CSCF server device 130 may validate and then forward requests from the corresponding UE 110, and may process and forward responses to the corresponding UE 110.

S-CSCF server device 140 may include one or more server devices, or other types of computation or communication devices, that gather, process, search, and/or provide information in a manner described herein. In an exemplary implementation, S-CSCF server device 140 may be a central node of the signaling plane, and may perform session control. S-CSCF server device 140 may handle SIP registrations, may inspect signaling messages, may decide to which device(s) a SIP message may be forwarded, may provide routing services, etc. In another exemplary implementation, S-CSCF server device 140 may monitor a SDP value (or parameter) associated with a VoIP call involving a corresponding UE 110, and may determine whether the VoIP call changed from active to hold or from hold to active based on the SDP value. If the SDP value changes from active to hold, S-CSCF server device 140 may provide a keep alive message to the corresponding UE 110 (e.g., repeatedly) to prevent the corresponding UE 110 from going dormant (e.g., due to expiration of an inactivity timer provided in RNC 120). If the SDP value changes from hold to active, S-CSCF server device 140 may stop providing the keep alive message to the corresponding UE 110, and the VoIP call may be retrieved from hold. Further details of S-CSCF 140 are provided below in connection with, for example, FIG. 5.

Each of IMS home networks 150-A and 150-B may include one or more computation or communication devices that gather, process, search, and/or provide information in a manner described herein. In an exemplary implementation, each of IMS home networks 150-A and 150-B may include a network that delivers IP multimedia services via one or more protocols (e.g., via SIP, SDP, etc.), and includes one or more interrogating call session control function (I-CSCF) server devices, P-CSCF server devices 130, S-CSCF server devices 140, telephony application servers (TASs), voice call continuity (VCC) devices, etc.

Network 160 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. In one exemplary implementation, network 160 may include a network that supports a VoIP call between UEs 110 (e.g., between UE 110-A and UE 110-B).

Although FIG. 1 shows exemplary components (e.g., devices) of network 100, in other implementations, network 100 may contain fewer, different, differently arranged, or additional components than depicted in FIG. 1. For example, network 100 may include one or more other IMS network devices (e.g., base stations) not depicted in FIG. 1.

Figure 2:
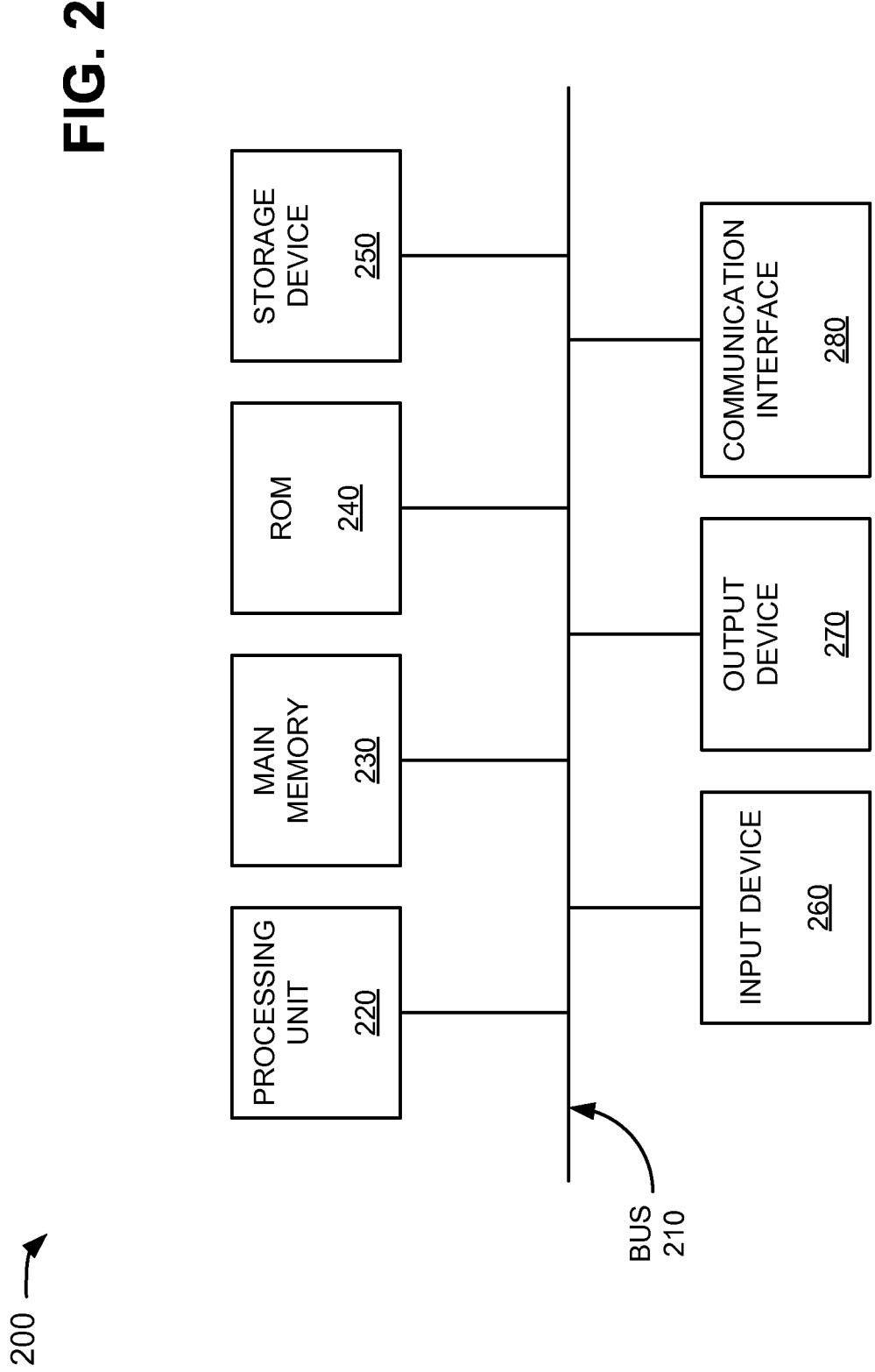
FIG. 2 illustrates a diagram of exemplary components of a radio network controller (RNC), a proxy call session control function (P-CSCF) server device, or a serving call session control function (S-CSCF) server device of the network depicted in FIG. 1.

FIG. 2 is an exemplary diagram of a device 200 that may correspond to one or more of RNC 120, P-CSCF server device 130, or S-CSCF server device 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
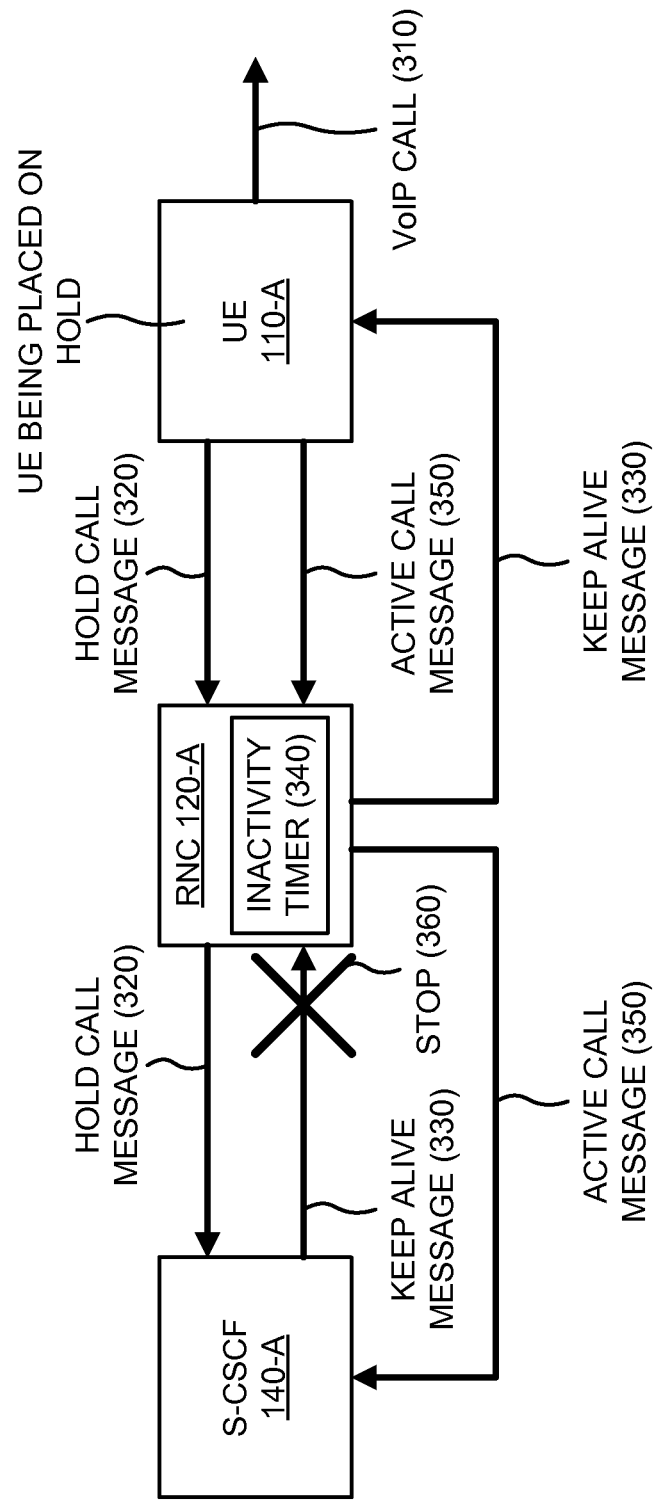
FIG. 3 depicts a diagram of exemplary interactions among components of an exemplary portion of the network illustrated in FIG. 1.

FIG. 3 depicts a diagram of exemplary interactions among components of an exemplary portion 300 of network 100. As illustrated, exemplary network portion 300 may include UE 110-A, RNC 120-A, and S-CSCF server device 140-A. UE 110-A, RNC 120-A, and/or S-CSCF server device 140-A may include the features described above in connection with, for example, FIGS. 1 and 2.

As further shown in FIG. 3, UE 110-A may be involved in a VoIP call 310 (e.g., with UE 110-B). VoIP call 310 may establish a two-way transmission between UE 110-A and UE 110-B (e.g., based on a media attribute (e.g., "sendrecv") in a SDP parameter associated with VoIP call 310). UE 110-B may place VoIP call 310 with UE 110-A on hold by sending a signaling message to UA 110-A (e.g., via RNC 120-B and S-CSCF server device 140-B), and UE 110-A may accept the call hold by providing a hold call message 320 (e.g., an acknowledgement message) to UE 110-B via RNC 120-A and S-CSCF server device 140-A. In one exemplary implementation, hold call message 320 may include a SIP "200" OK message responding to a SIP re-invite message (e.g., generated by UE 110-B). S-CSCF server device 140-A may monitor a SDP value (or parameter) associated with hold call message 320 to determine whether VoIP call 310 is being changed from "active" to "hold" or from "hold" to "active." In one example, S-CSCF 140-A may monitor a media attribute in a SDP parameter associated with the SIP "200" OK message (e.g., hold call message 320) provided by UE 110-A. Alternatively and/or additionally, S-CSCF 140-A may monitor a media attribute in a SDP parameter associated with the SIP re-invite message (e.g., generated by UE 110-B) rather than the SIP "200" OK message provided by UE 110-A.

S-CSCF server device 140-A may determine that VoIP call 310 is being successfully placed on hold when the SIP "200" OK message contains a "sendonly," "recvonly," or "inactive" media attribute in the SDP parameter. When S-CSCF server device 140-A determines that VoIP call 310 is being placed on hold, S-CSCF server device 140-A may send a keep alive message 330 to UE 110-A, via RNC 120-A. In one example, keep alive message 330 may include a SIP signaling message (e.g., a SIP option message). A SIP option message may be used for keep alive message 330 since a SIP option message can be sent from outside an existing SIP dialog (e.g., for VoIP call to keep UE 110-A active) so that a sequence number of an existing dialog for VoIP call 310 may not be impacted. Furthermore, by using a SIP signaling message from out of a dialog, keep alive message 330 may not be sent end to end (e.g., from one UE 110-A to another UE 110-B), but rather from S-CSCF server device 140-A to its served UE 110-A. Similarly, S-CSCF server device 140-B may provide a keep alive message to UE 110-B, as described below in connection with FIG. 4.

In one exemplary implementation, keep alive message 330 may be repeatedly sent (e.g., by S-CSCF server device 140-A) to UE 110-A at an interval that is smaller than a duration of time (e.g., about five to about thirty seconds) associated with an inactivity timer 340 maintained in RNC 120-A. For example, if the duration of time associated with inactivity timer 340 (e.g., the time limit allotted for UE 110-A to be inactive before RNC 120-A places UE 110-A in a dormant state) is seven seconds, keep alive message 330 may be repeatedly sent (e.g., by S-CSCF server device 140-A) to UE 110-A less than every seven seconds. Repeatedly sending keep alive message 330 to UE 110-A at an interval that is smaller than the duration of time associated with inactivity timer 340 may prevent RNC 120-A from putting UE 110-A into a dormant state (e.g., due to expiration of inactivity timer 340).

As further shown in FIG. 3, when VoIP call 310 is being retrieved from hold, UE 110-A may provide an active call message 350 to S-CSCF server device 140-A via RNC 120-A. In one exemplary implementation, active call message 350 may include a SIP "200" OK message responding to a SIP re-invite message (e.g., generated by UE 110-B). S-CSCF server device 140-A may monitor a SDP value (or parameter) associated with active call message 350 to determine whether VoIP call 310 is being changed from "active" to "hold" or from "hold" to "active." In one example, S-CSCF 140-A may monitor a media attribute in a SDP parameter associated with the SIP "200" OK message (e.g., active call message 350) provided by UE 110-A. S-CSCF server device 140-A may determine that VoIP call 310 is being successfully retrieved from hold when the SIP "200" OK message contains a "sendrecv" media attribute in the SDP parameter or does not contain "sendonly," "recvonly," or "inactive" media attributes in the SDP parameter. When S-CSCF server device 140-A determines that VoIP call 310 is being retrieved from hold, S-CSCF server device 140-A may stop sending keep alive message 330 to UE 110-A, as indicated by reference number 360. Two-way communication for VoIP call 310 may then be re-established between UE 110-A and UE 110-B, and VoIP call 310 may be retrieved from hold (i.e., may be active).

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300. In one exemplary implementation, S-CSCF server device 140-A may be replaced by P-CSCF server device 130-A, and P-CSCF server device 130-A may perform the functionality described above (for FIG. 3) in connection with S-CSCF server device 140-A. In another exemplary implementation (e.g., a non-IMS network implementation), S-CSCF server device 140-A may be replaced by a SIP proxy server used to set up VoIP call 310, and the SIP proxy server may perform the functionality described above (for FIG. 3) in connection with S-CSCF server device 140-A.

Figure 4:
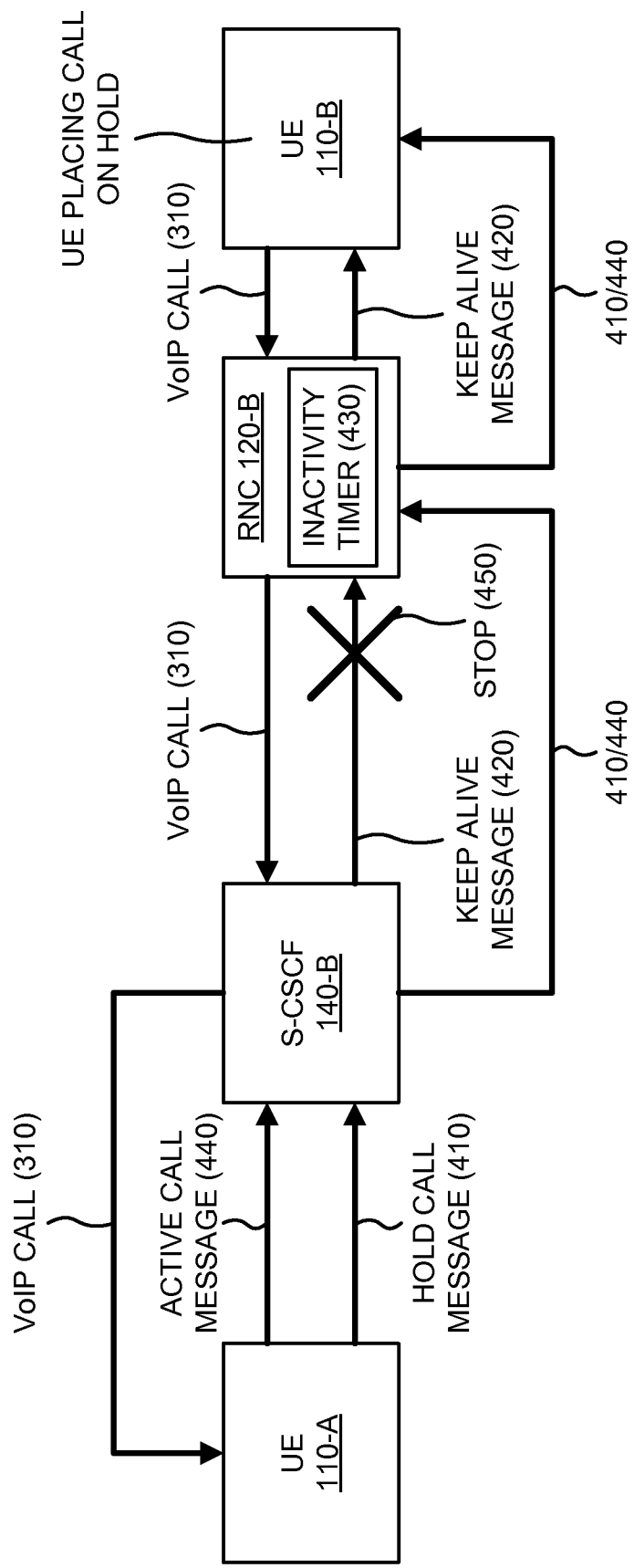
FIG. 4 illustrates a diagram of exemplary interactions among components of another exemplary portion of the network depicted in FIG. 1.

FIG. 4 illustrates a diagram of exemplary interactions among components of another exemplary portion 400 of network 100. As illustrated, exemplary network portion 400 may include UE 110-A, UE 110-B, RNC 120-B, and S-CSCF server device 140-B. UE 110-A, UE 110-B, RNC 120-B, and/or S-CSCF server device 140-B may include the features described above in connection with, for example, FIGS. 1-3.

As further shown in FIG. 4, UE 110-B may be involved in VoIP call 310 (e.g., with UE 110-A). VoIP call 310 may establish a two-way transmission between UE 110-A and UE 110-B (e.g., based on a media attribute (e.g., "sendrecv") in a SDP parameter associated with VoIP call 310). UE 110-B may place VoIP call 310 with UE 110-A on hold by sending a signaling message (not shown) to UE 110-A (e.g., via RNC 120-B and S-CSCF server device 140-B), and UE 110-A may provide a hold call message 410 to UE 110-B via RNC 120-B and S-CSCF server device 140-B. In one exemplary implementation, hold call message 410 may include a SIP "200" OK message responding to a SIP re-invite message (e.g., generated by UE 110-B). S-CSCF server device 140-B may monitor a SDP value (or parameter) associated with hold call message 410 to determine whether VoIP call 310 is being changed from "active" to "hold" or from "hold" to "active." In one example, S-CSCF 140-B may monitor a media attribute in a SDP parameter associated with the SIP "200" OK message provided by UE 110-A. Alternatively and/or additionally, S-CSCF 140-B may monitor a media attribute in a SDP parameter associated with the SIP re-invite message (e.g., generated by UE 110-B) rather than the SIP "200" OK message provided by UE 110-A.

S-CSCF server device 140-B may determine that VoIP call 310 is being successfully placed on hold when the SIP "200" OK message contains a "sendonly," "recvonly" or "inactive" media attribute in the SDP parameter. When S-CSCF server device 140-B determines that VoIP call 310 is being placed on hold, S-CSCF server device 140-B may send a keep alive message 420 to UE 110-B. In one example, keep alive message 420 may include a SIP signaling message (e.g., a SIP option message). A SIP option message may be used for keep alive message 420 since a SIP option message can be sent from out of an existing SIP dialog for VoIP call 310 (e.g., to keep VoIP call 310 in an active state) so that a sequence number of an existing dialog for VoIP call 310 may not be impacted. Furthermore, by using a SIP signaling message out of a dialog, keep alive message 420 may not be sent end to end (e.g., from one UE 110-A to another UE 110-B), but rather from S-CSCF server device 140-B to its served UE 110-B.

In one exemplary implementation, keep alive message 420 may be repeatedly sent (e.g., by S-CSCF server device 140-B) to UE 110-B at an interval that is smaller than a duration of time (e.g., about five to about thirty seconds) associated with an inactivity timer 430 maintained in RNC 120-B. For example, if the duration of time associated with inactivity timer 430 (e.g., the time limit allotted for UE 110-B to be inactive before RNC 120-B places UE 110-B in a dormant state) is seven seconds, keep alive message 420 may be repeatedly sent (e.g., by S-CSCF server device 140-B) to UE 110-B less than every seven seconds. Repeatedly sending keep alive message 420 to UE 110-B at an interval that is smaller than the duration of time associated with inactivity timer 430 may prevent RNC 120-B from putting UE 110-B into a dormant state (e.g., due to expiration of inactivity timer 430).

As further shown in FIG. 4, when VoIP call 310 is being retrieved from hold, UE 110-A may provide an active call message 440 to UE 110-B via RNC 120-B and S-CSCF server device 140-B. In one exemplary implementation, active call message 440 may include a SIP "200" OK message responding to a SIP re-invite message (e.g., generated by UE 110-B). S-CSCF server device 140-B may monitor a SDP value (or parameter) associated with active call message 440 to determine whether VoIP call 310 is being changed from "active" to "hold" or from "hold" to "active." In one example, S-CSCF 140-B may monitor a media attribute in a SDP parameter associated with the SIP "200" OK message (e.g., active call message 440) provided by UE 110-A. S-CSCF server device 140-B may determine that VoIP call 310 is being successfully retrieved from hold when the SIP "200" OK message contains a "sendrecv" media attribute in the SDP parameter or does not contain "sendonly," "recvonly," or "inactive" media attributes in the SDP parameter. When S-CSCF server device 140-B determines that VoIP call 310 is being retrieved from hold, S-CSCF server device 140-B may stop sending keep alive message 420 to UE 110-B, as indicated by reference number 450. Two-way communication for VoIP call 310 may then be re-established between UE 110-A and UE 110-B, and VoIP call 310 may be retrieved from hold (i.e., may be active).

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400. In one exemplary implementation, S-CSCF server device 140-B may be replaced by P-CSCF server device 130-B, and P-CSCF server device 130-B may perform the functionality described above (for FIG. 4) in connection with S-CSCF server device 140-B. In another exemplary implementation (e.g., a non-IMS network implementation), S-CSCF server device 140-B may be replaced by a SIP proxy server used to set up VoIP call 310, and the SIP proxy server may perform the functionality described above (for FIG. 4) in connection with S-CSCF server device 140-B.

Figure 5:
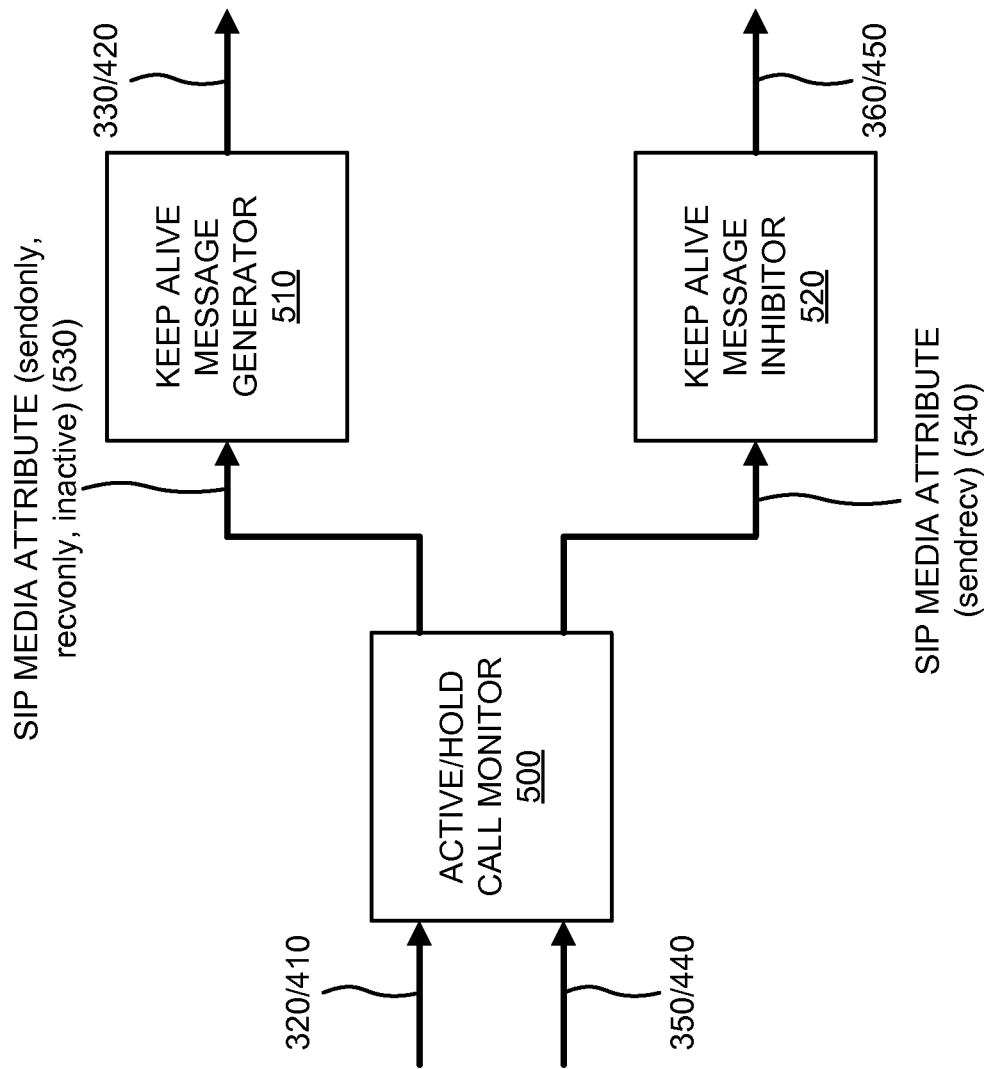
FIG. 5 depicts a diagram of exemplary functional components of one of the S-CSCF server devices illustrated in FIG. 1.

FIG. 5 depicts a diagram of exemplary functional components of one of S-CSCF server devices 140 (e.g., S-CSCF server device 140-A or S-CSCF server device 140-B). In one implementation, the functions described in connection with FIG. 5 may be performed by one or more of the components of device 200, as depicted in FIG. 2. As shown in FIG. 5, S-CSCF server device 140 may include an active/hold call monitor 500, a keep alive message generator 510, and a keep alive message inhibitor 520.

Active/hold call monitor 500 may include hardware or a combination of hardware and software that may receive hold call message 320 or active call message 350 from UE 110-A, or may receive hold call message 410 or active call message 440 from UE 110-B. Active/hold call monitor 500 may monitor a SIP media attribute (e.g., a SDP value) associated with hold call message 320, active call message 350, hold call message 410, or active call message 440 to determine whether a VoIP call (e.g., VoIP call 310) is being changed from "active" to "hold" or from "hold" to "active." If active/hold call monitor 500 determines that the SIP media attribute includes "sendonly," "recvonly," or "inactive" indications (e.g., indicating that VoIP call 310 changed from "active" to "hold"), active/hold call monitor 500 may provide this information to keep alive message generator 510, as indicated by reference number 530. If active/hold call monitor 500 determines that the SIP media attribute includes a "sendrecv" indication (or does not include "sendonly," "recvonly," or "inactive" indications) (e.g., indicating that VoIP call 310 changed from "hold" to "active"), active/hold call monitor 500 may provide this information to keep alive message inhibitor 520, as indicated by reference number 540.

Keep alive message generator 510 may include hardware or a combination of hardware and software that may receive SIP media attribute 530 from active/hold call monitor 500, and may send (e.g., based on SIP media attribute 530) keep alive message 330 to UE 110-A. Alternatively, keep alive message generator 510 may send (e.g., based on SIP media attribute 530) keep alive message 420 to UE 110-B.

Keep alive message inhibitor 520 may include hardware or a combination of hardware and software that may receive SIP media attribute 540 from active/hold call monitor 500, and may stop 360 sending (e.g., based on SIP media attribute 540) keep alive message 330 to UE 110-A. Alternatively, keep alive message inhibitor 520 may stop 450 sending (e.g., based on SIP media attribute 540) keep alive message 450 to UE 110-B. When keep alive message inhibitor 520 stops 360/450 sending keep alive message 330/420 to UE 120-A/120-B, two-way communication for VoIP call 310 may be re-established between UE 110-A and UE 110-B, and VoIP call 310 may be retrieved from hold (i.e., may be active).

Although FIG. 5 shows exemplary functional components of S-CSCF server device 140, in other implementations, S-CSCF server device 140 may contain fewer, different, differently arranged, or additional functional components than depicted in FIG. 5. In still other implementations, one or more functional components of S-CSCF server device 140 may perform one or more other tasks described as being performed by one or more other functional components of S-CSCF server device 140.

Figure 6:
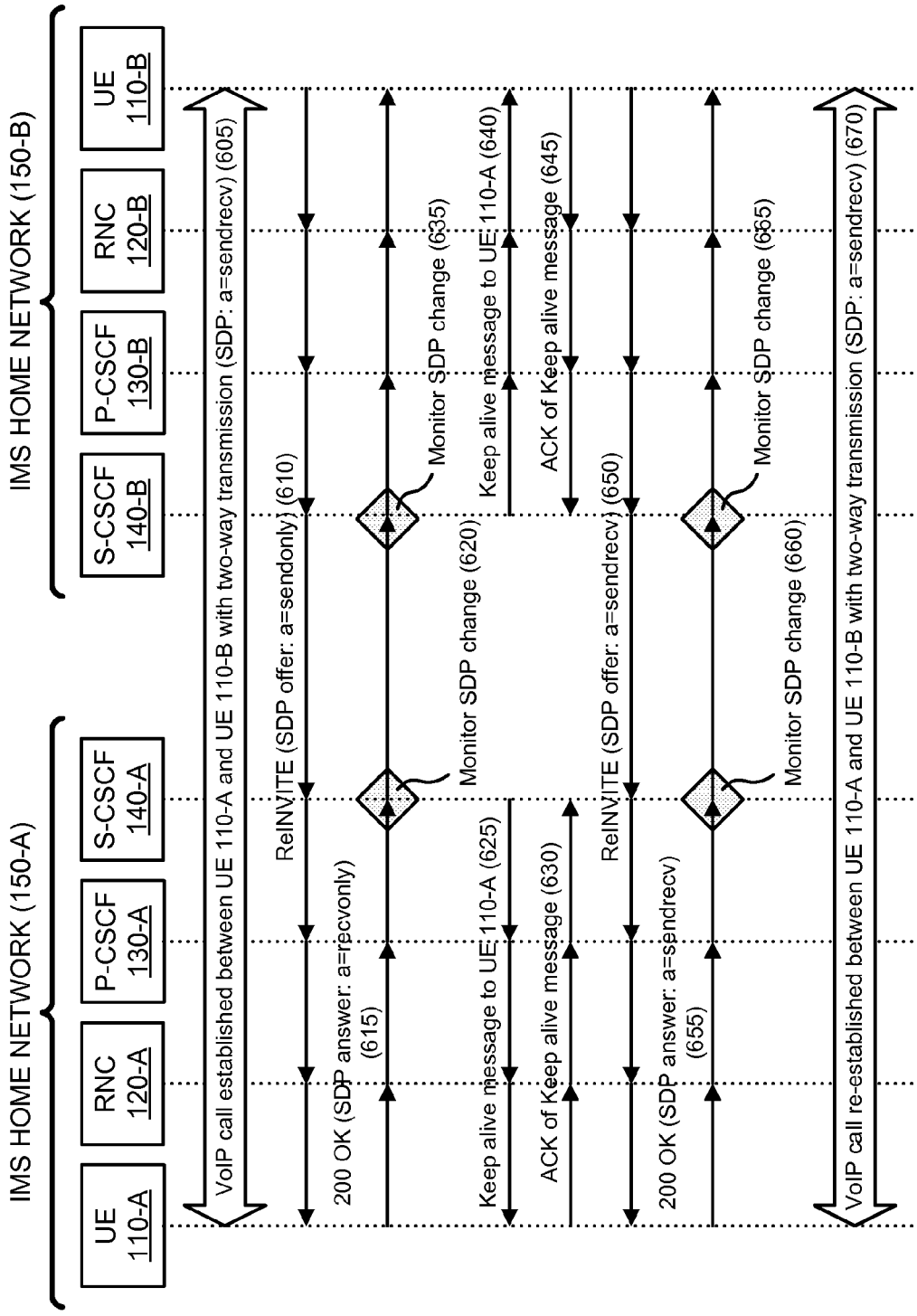
FIG. 6 illustrates a diagram of an exemplary call flow among an exemplary portion of the network depicted in FIG. 1 and according to implementations described herein.

FIG. 6 illustrates a diagram of an exemplary call flow among an exemplary portion 600 of network 100. As shown, exemplary network portion 600 may include UEs 110-A and 110-B, RNCs 120-A and 120-B, P-CSCF server devices 130-A and 130-B, S-CSCF server devices 140-A and 140-B, and IMS home networks 150-A and 150-B. UEs 110-A and 110-B, RNCs 120-A and 120-B, P-CSCF server devices 130-A and 130-B, S-CSCF server devices 140-A and 140-B, and/or IMS home networks 150-A and 150-B may include the features described above in connection with, for example, FIGS. 1-5.

As further shown in FIG. 6, a VoIP call may be established between UE 110-A and UE 110-B with two-way transmission, and a "sendrecv" SDP parameter may be associated with the VoIP call (block 605). UE 110-B may place the VoIP call on hold, and may provide a SIP re-invite message (e.g., that includes a "sendonly" SDP parameter) to UE 110-A via RNCs 120-A and 120-B, PCSCF server devices 130-A and 130-B, and S-CSCF server devices 140-A and 140-B (block 610). In response to the SIP re-invite message, UE 110-A may generate a SIP "200" OK message (e.g., that includes a "recvonly" SDP parameter) and may provide the SIP "200" OK message to UE 110-B via RNCs 120-A and 120-B, PCSCF server devices 130-A and 130-B, and S-CSCF server devices 140-A and 140-B (block 615).

S-CSCF server device 140-A may monitor the SDP parameter provided in the SIP "200" OK message to determine if there is a change in the SDP parameter (block 620). If S-CSCF server device 140-A detects a change in the SDP parameter (e.g., from "sendrecv" to "recvonly"), S-CSCF server device 140-A may provide a keep alive message (e.g., keep alive message 330 (FIG. 3)) to UE 110-A via RNC 120-A and P-CSCF server device 130-A (block 625). In one exemplary implementation, S-CSCF server device 140-A may repeatedly send the keep alive message to UE 110-A at an interval that is smaller than a duration of time associated with an inactivity timer maintained in RNC 120-A (e.g., so that the inactivity timer will not expire and render UE 110-A dormant). UE 110-A may acknowledge receipt of the keep alive message (e.g., with a SIP acknowledgment (ACK) message) via RNC 120-A and P-CSCF server device 130-A (block 630).

S-CSCF server device 140-B may monitor the SDP parameter provided in the SIP "200" OK message to determine if there is a change in the SDP parameter (block 635). If S-CSCF server device 140-B detects a change in the SDP parameter (e.g., from "sendrecv" to "recvonly"), S-CSCF server device 140-B may provide a keep alive message (e.g., keep alive message 420 (FIG. 4)) to UE 110-B via RNC 120-B and P-CSCF server device 130-B (block 640). In one exemplary implementation, S-CSCF server device 140-B may repeatedly send the keep alive message to UE 110-B at an interval that is smaller than a duration of time associated with an inactivity timer maintained in RNC 120-B (e.g., so that the inactivity timer will not expire and render UE 110-B dormant). UE 110-B may acknowledge receipt of the keep alive message (e.g., with a SIP ACK message) via RNC 120-B and P-CSCF server device 130-B (block 645).

As further shown in FIG. 6, UE 110-B may retrieve the VoIP call from hold, and may provide a SIP re-invite message (e.g., that includes a "sendrecv" SDP parameter) to UE 110-A via RNCs 120-A and 120-B, PCSCF server devices 130-A and 130-B, and S-CSCF server devices 140-A and 140-B (block 650). In response to the SIP re-invite message, UE 110-A may generate a SIP "200" OK message (e.g., that includes a "sendrecv" SDP parameter) and may provide the SIP "200" OK message to UE 110-B via RNCs 120-A and 120-B, PCSCF server devices 130-A and 130-B, and S-CSCF server devices 140-A and 140-B (block 655).

S-CSCF server device 140-A may monitor the SDP parameter provided in the SIP "200" OK message to determine if there is a change in the SDP parameter (block 660). If S-CSCF server device 140-A detects a change in the SDP parameter (e.g., from "recvonly" to "sendrecv"), S-CSCF server device 140-A may stop providing the keep alive message (at block 625) to UE 110-A. S-CSCF server device 140-B may monitor the SDP parameter provided in the SIP "200" OK message to determine if there is a change in the SDP parameter (block 665). If S-CSCF server device 140-B detects a change in the SDP parameter (e.g., from "recvonly" to "sendrecv"), S-CSCF server device 140-B may stop providing the keep alive message (at block 640) to UE 110-B. The VoIP call may be re-established between UE 110-A and UE 110-B with two-way transmission and the "sendrecv" SDP parameter may be associated with the VoIP call (block 670).

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
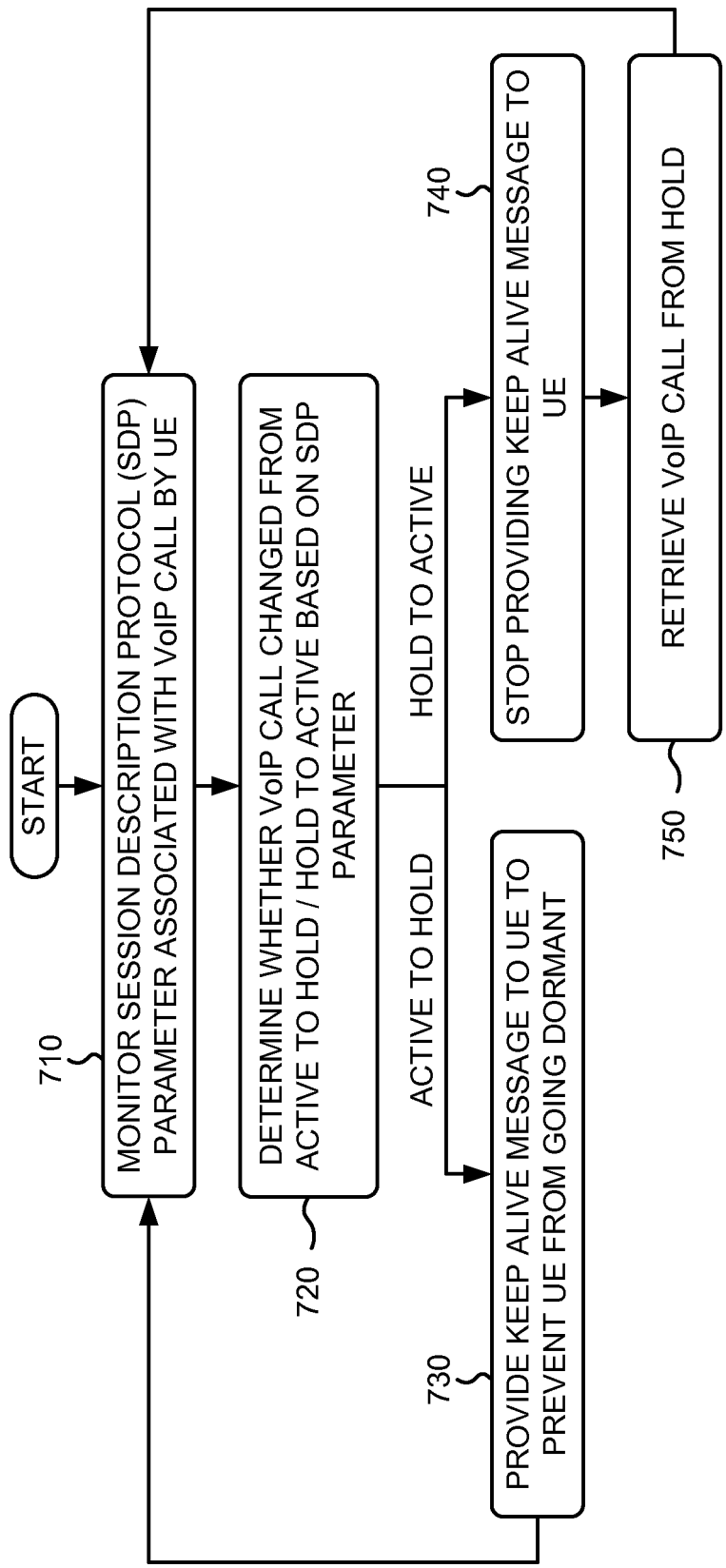
Figure 8:
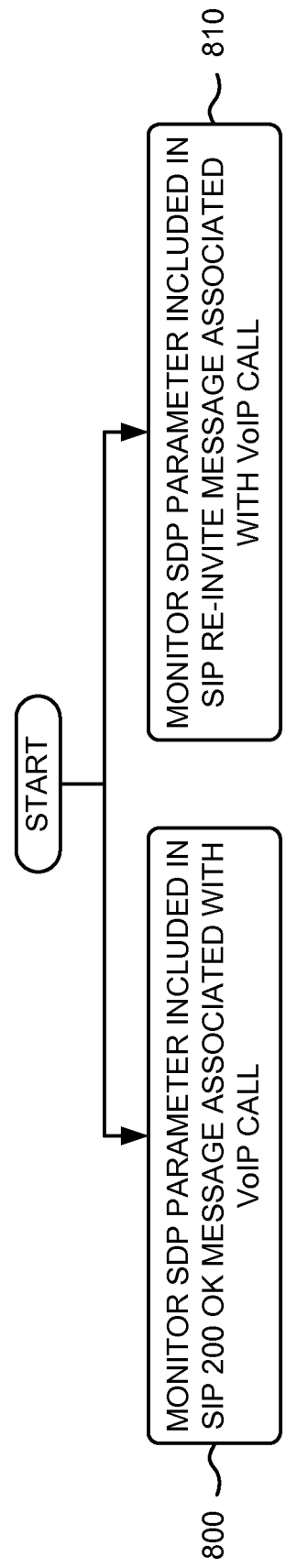

FIGS. 7-9 illustrate flow charts of an exemplary process 700 for using SIP signaling to keep a VoIP session active during a call hold according to implementation described herein. In one implementation, process 700 may be performed by S-CSCF server device 140. In another implementation, some or all of process 700 may be performed by another device or group of devices (e.g., P-CSCF server device 130), including or excluding S-CSCF server device 140.

As shown in FIG. 7, process 700 may include monitoring a session description protocol (SDP) parameter associated with a voice over Internet protocol (VoIP) call by a user equipment (UE) (block 710), and determining whether the VoIP call changed from active to hold or from hold to active based on the SDP parameter (block 720). For example, in implementations described above in connection with FIG. 3, S-CSCF server device 140-A may monitor a SDP value (or parameter) associated with hold call message 320 to determine whether VoIP call 310 is being changed from "active" to "hold" or from "hold" to "active." In one example, S-CSCF 140-A may monitor a media attribute in a SDP parameter associated with the SIP "200" OK message (e.g., hold call message 320) provided by UE 110-A.

As further shown in FIG. 7, when the VoIP call is determined to be changed from active to hold (block 720—ACTIVE TO HOLD), a keep alive message may be provided to the UE to prevent the UE from going dormant (block 730) and process 700 may return to block 710. For example, in implementations described above in connection with FIG. 3, S-CSCF server device 140-A may determine that VoIP call 310 is being successfully placed on hold when the SIP "200" OK message contains a "sendonly," "recvonly," or "inactive" media attribute in the SDP parameter. When S-CSCF server device 140-A determines that VoIP call 310 is being placed on hold, S-CSCF server device 140-A may send keep alive message 330 to UE 110-A. In one example, keep alive message 330 may include a SIP signaling message (e.g., a SIP option message). In one example, keep alive message 330 may be repeatedly sent (e.g., by S-CSCF server device 140-A) to UE 110-A at an interval that is smaller than a duration of time (e.g., about five to about thirty seconds) associated with inactivity timer 340 maintained in RNC 120-A. Repeatedly sending keep alive message 330 to UE 110-A at an interval that is smaller than the duration of time associated with inactivity timer 340 may prevent RNC 120-A from putting UE 110-A into a dormant state (e.g., due to expiration of inactivity timer 340).

Returning to FIG. 7, when the VoIP is determined to be changed from hold to active (block 720—HOLD TO ACTIVE), provision of the keep alive message to the UE may be stopped (block 740), the VoIP call may be retrieved from hold (block 750), and process 700 may return to block 710. For example, in implementations described above in connection with FIG. 3, when VoIP call 310 is being retrieved from hold, UE 110-A may provide active call message 350 to RNC 120-A and S-CSCF server device 140-A. In one example, active call message 350 may include a SIP "200" OK message responding to a SIP re-invite message (e.g., generated by UE 110-B). S-CSCF 140-A may monitor a media attribute in a SDP parameter associated with the SIP "200" OK message (e.g., active call message 350) to determine whether VoIP call 310 is being changed from "active" to "hold" or from "hold" to "active." S-CSCF server device 140-A may determine that VoIP call 310 is being successfully retrieved from hold when the SIP "200" OK message contains a "sendrecv" media attribute in the SDP parameter or does not contain "sendonly," "recvonly," or "inactive" media attributes in the SDP parameter. When S-CSCF server device 140-A determines that VoIP call 310 is being retrieved from hold, S-CSCF server device 140-A may stop sending keep alive message 330 to UE 110-A, as indicated by reference number 360. Two-way communication for VoIP call 310 may then be re-established between UE 110-A and UE 110-B, and VoIP call 310 may be retrieved from hold (i.e., may be active).

Process block 710 may include the process blocks depicted in FIG. 8. As shown in FIG. 8, process block 710 may include monitoring a SDP parameter included in a SIP "200" OK message associated with the VoIP call (block 800) or monitoring a SDP parameter included in a SIP re-invite message associated with the VoIP call (block 810). For example, in implementations described above in connection with FIG. 3, S-CSCF 140-A may monitor a media attribute in a SDP parameter associated with the SIP "200" OK message (e.g., hold call message 320) provided by UE 110-A. Alternatively and/or additionally, S-CSCF 140-A may monitor a media attribute in a SDP parameter associated with the SIP re-invite message (e.g., generated by UE 110-B) rather than the SIP "200" OK message provided by UE 110-A.

Process block 720 may include the process blocks depicted in FIG. 9. As shown in FIG. 9, process block 720 may include determining the VoIP call to be placed on hold when a response message to a SIP re-invite message includes "sendonly," "recvonly," or "inactive" as a SDP parameter (block 900), determining the VoIP call to be retrieved from hold when a response message to a SIP re-invite message includes "sendrecv" as a SDP parameter (block 910), and determining the VoIP call to be retrieved from hold when a response message to a SIP re-invite message does not include "sendonly," "recvonly," or "inactive" as a SDP parameter (block 920). For example, in implementations described above in connection with FIG. 4, S-CSCF server device 140-B may determine that VoIP call 310 is being successfully placed on hold when the SIP "200" OK message contains a "sendonly," "recvonly" or "inactive" media attribute in the SDP parameter. S-CSCF server device 140-B may determine that VoIP call 310 is being successfully retrieved from hold when the SIP "200" OK message contains a "sendrecv" media attribute in the SDP parameter or does not contain "sendonly," "recvonly," or "inactive" media attributes in the SDP parameter.

Implementations described herein may provide systems and/or methods that may use SIP signaling to keep a VoIP session active during a call hold. For example, in one implementation, a SIP proxy server may determine if a VoIP call is being put on hold by monitoring a change of a media attribute in a SDP parameter associated with the VoIP call. When the VoIP call is placed on hold, the SIP proxy server may send a SIP signaling message (e.g., a keep alive message) repeatedly to a UE (e.g., served by the SIP proxy server) in order to prevent a RNC from putting the UE into a dormant state (e.g., due to expiration of the inactivity timer). The SIP proxy server may determine if the VoIP call is being retrieved from hold by monitoring a change of the media attribute in the SDP parameter associated with the VoIP call. When the VoIP call is retrieved from hold, the SIP proxy server may stop sending the keep alive message to the UE.

Implementations described herein may provide a network-based approach that prevents UEs from moving from an "active" state to a "dormant" state when a VoIP call is placed on hold and that prevents voice clipping when the VoIP call is retrieved from hold. The implementations described herein may be applied to VoIP calls that use SIP signaling and to networks (e.g., an IMS network, a LTE network, or any other network) that utilize an inactivity time for placing UEs into a "dormant" state. Furthermore, the keep alive messages described herein may be sent to UEs only when a VoIP call is placed on hold. In contrast, conventional systems constantly provide keep alive methods between network elements. However, implementations described herein may co-exist with such conventional keep alive methods. Conventional systems also do not provide a network-based solution that prevents UEs from moving from an "active" state to a "dormant" state when a VoIP call is placed on hold.

Implementations described herein may work with any type of UE since the keep alive messages may be initiated using a standard protocol (e.g., SIP, SDP, etc.) that the UE may use to set up a VoIP call. Furthermore, implementations described herein may not encounter any firewall issues since they use the same protocol (e.g., SIP, SDP, etc.) used to set up the VoIP call. The keep alive messages described herein may be provided from SIP proxy servers (e.g., S-CSCF server devices 140-A and 140-B) to UEs (e.g., UEs 110-A and 110-B) at both ends of a VoIP call and no information may be exchanged between S-CSCF server device 140-A and S-CSCF server device 140-B. With such an arrangement, UEs 110-A and 110-B at both ends of the VoIP call may be kept alive without sending a keep alive message from UE 110-A to UE 110-B or vice versa.

Although exemplary implementations described herein depict S-CSCF server device 140 as the SIP proxy server providing a keep alive message to UE 110 (e.g., to prevent UE 110 from going dormant), in other implementations, P-CSCF server device 130 (or some other SIP proxy server associated with an IMS network) may provide the keep alive message to UE 110. Furthermore, for non-IMS networks (e.g., an over-the-top VoIP application implementation or long term evolution (LTE) networks), a SIP proxy server used to set up a VoIP call may provide the keep alive message to the UE 110. The implementations described herein may be applied to LTE networks since a base station (e.g., an "eNodeB") may also utilize a similar inactivity timer for UEs as RNC 120. In fact, implementations described herein may be applied to any wireless network that uses an inactivity timer to change a UE from an active state to a dormant state and provides a call that is set up using SIP signaling.

In one exemplary implementation, the keep alive message may be sent to each UE that includes a wireless connection via a RNC (or some other device that may place the UE in a dormant state). In one example, if UEs 110-A and 110-B are both mobile communication devices (e.g., cell phones), S-CSCF server devices 140-A and 140-B may provide the keep alive message to UEs 110-A and 110-B respectively. In another example, if UE 110-A is a landline telephone and UE 110-B is a mobile communication device (e.g., a cell phone), only S-CSCF server device 140-B may provide the keep alive message to UE 110-B and the keep alive message need not be provided to UE 110-A (e.g., the landline telephone).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
   receiving, at a computing device of a first network and from a first user device associated with a second network, a first message intended for a second user device associated with the first network,
      the first message including a first parameter,
         the first parameter indicating that a voice over Internet protocol (VoIP) call between the first user device and the second user device is changing from an active state to a hold state, and
      the first message including a session initiation protocol (SIP) re-invite message and the first parameter including a first session description protocol (SDP) parameter;
   receiving, by the computing device and from the second user device, a second message intended for the first user device,
      the second message including a second parameter associated with the VoIP call, and
      the second message including a SIP OK message and the second parameter including a second SDP parameter;
   determining, by the computing device and based on the first parameter and the second parameter, that the VoIP call changed from the active state to the hold state; and
   providing, by the computing device and after the VoIP call is determined to have changed from the active state to the hold state, a keep alive message to the second user device to prevent the second user device from entering a dormant state,
      the keep alive message being provided from outside a SIP dialog associated with the VoIP call to prevent the keep alive message from impacting a sequence number of the SIP dialog.

2. The computing device-implemented method of claim 1, further comprising:
   determining that the VoIP call has changed from the hold state to the active state, and
   stopping provision of the keep alive message to the second user device after the VoIP call is determined to change from the hold state to the active state.

3. The computing device-implemented method of claim 2, further comprising:
   retrieving the VoIP call from hold after the VoIP call is determined to change from the hold state to the active state.

4. The computing device-implemented method of claim 1, where determining that the VoIP call changed from the active state to the hold state includes one or more of:
   determining the VoIP call to be in the hold state when the first message includes sendonly, recvonly, or inactive as the first parameter; or
   determining the VoIP call to be in the hold state when the second message includes sendonly, recvonly, or inactive as the second parameter.

5. The computing device-implemented method of claim 1, where providing the keep alive message from outside the SIP dialog prevents the keep alive message from being sent to the first user device.

6. The computing device-implemented method of claim 1, where providing the keep alive message includes:
repeatedly providing the keep alive message to the second user device at an interval that is smaller than an inactivity time limit associated with the second user device.

7. The computing device-implemented method of claim 6, where the inactivity time limit is determined by a controller associated with the second user device, and
where a connection between the controller and the second user device is released upon expiration of the inactivity time limit.

8. The computing device-implemented method of claim 1, where the computing device comprises a SIP proxy server.

9. The computing device-implemented method of claim 8, where the VoIP call is provided via an Internet protocol multimedia subsystem (IMS) network, and
where the SIP proxy server comprises one of:
a proxy call session control function (P-CSCF) server device, or
a serving call session control function (S-CSCF) server device.

10. The computing device-implemented method of claim 8, where the VoIP call is provided via a long term evolution (LTE) network, and
where the SIP proxy server comprises a SIP proxy server used to set up the VoIP call.

11. The computing device-implemented method of claim 1, where the second user device comprises one or more of:
a radiotelephone,
a personal communications system (PCS) terminal,
a wireless telephone,
a cellular telephone,
a smart phone,
a personal digital assistant (PDA), or
a laptop computer with a broadband air card.

12. A device comprising:
a processor, associated with a first network, to:
receive, from a first user device associated with a second network, a first message intended for a second user device associated with the first network,
the first message including a first parameter indicating that a voice over Internet protocol (VoIP) call between the first user device and the second user device is changing from an active state to a hold state,
the first message including a session initiation protocol (SIP) re-invite message, and
the first parameter including a first session description protocol (SDP) parameter,
receive, from the second user device, a second message,
the second message including a second parameter associated with the VoIP call,
the second message including a SIP OK message and the second parameter including a second SDP parameter,
determine, based on the first parameter and the second parameter, that the VoIP call changed from the active state to the hold state, and
send, after the VoIP call is determined to have changed from the active state to the hold state, a keep alive message to the second user device to prevent the second user device from entering a dormant state,
the keep alive message being sent outside a SIP dialog associated with the VoIP call to prevent the keep alive message from impacting a sequence number of the SIP dialog.

13. The device of claim 12, where the first network includes one of:
an Internet protocol multimedia subsystem (IMS) network, or
a long term evolution (LTE) network.

14. The device of claim 12, where the processor is further to:
determine that the VoIP call has changed from the hold state to the active state, and
stop sending the keep alive message to the second user device after the VoIP call is determined to change from the hold state to the active state.

15. The device of claim 14, where the processor is further to:
retrieve the VoIP call from hold after the VoIP call is determined to change from the hold state to the active state.

16. The device of claim 12, where, when determining that the VoIP call changed from the active state to the hold state, the processor is further to one or more of:
determine the VoIP call to be in the hold state when the first message includes sendonly, recvonly, or inactive as the first SDP parameter, or
determine the VoIP call to be in the hold state when the second message includes sendonly, recvonly, or inactive as the second SDP parameter.

17. The device of claim 12, where the processor is further to:
repeatedly send the keep alive message to the second user device at an interval that is smaller than an inactivity time limit associated with the second user device.

18. The device of claim 17, where the inactivity time limit is determined by a radio network controller (RNC) associated with the second user device.

19. The device of claim 12, where the device comprises a SIP proxy server.

20. The device of claim 19, where the VoIP call is provided via an Internet protocol multimedia subsystem (IMS) network, and
where the SIP proxy server comprises one of:
a proxy call session control function (P-CSCF) server device, or
a serving call session control function (S-CSCF) server device.

21. The device of claim 19, where the VoIP call is provided via a long term evolution (LTE) network, and
where the SIP proxy server comprises a SIP proxy server used to set up the VoIP call.

22. A non-transitory computer-readable medium storing instructions, the instructions comprising:
one or more instructions that, when executed by a processor of a device associated with a first network, cause the processor to:
receive, from a first user device associated with a second network, a first message intended for a second user device associated with the first network,
the first message including a first session description protocol (SDP) parameter indicating that a voice over Internet protocol (VoIP) call between the first user device and the second user device is changing from an active state to a hold state, and
the first message including a session initiation protocol (SIP) re-invite message;

receive, from the second user device, a second message
   intended for the first user device,
   the second message including a second SDP parameter associated with the VoIP call, and
   the second message including a SIP OK message;
determine, based on the first SDP parameter and the second SDP parameter, that the VoIP call changed from an active state to a hold state; and
provide, after the VoIP call is determined to have changed from the active state to the hold state, a session initiation protocol (SIP) keep alive message to the second user device to prevent the second user device from entering a dormant state,
   the keep alive message being provided from outside a SIP dialog associated with the VoIP call to prevent the keep alive message from impacting a sequence number of the SIP dialog.

\* \* \* \* \*